United States Patent

[11] 3,607,737

| [72] | Inventor | Sven Gustaf Yngve Gamer<br>Norrkoping, Sweden |
|---|---|---|
| [21] | Appl. No. | 794,632 |
| [22] | Filed | Jan. 28, 1969 |
| [45] | Patented | Sept. 21, 1971 |
| [73] | Assignee | Stenberg-Flygt AB<br>Solna, Sweden |
| [32] | Priority | Sept. 18, 1968 |
| [33] | | Sweden |
| [31] | | 12598/68 |

[54] METHOD AND APPARATUS FOR THE AEROBIC PURIFICATION OF SEWAGE WATER AT A TEMPERATURE HIGHER THAN THE AMBIENT TEMPERATURE
3 Claims, 2 Drawing Figs.

[52] U.S. Cl............................................. 210/12,
210/15, 210/149, 210/180, 210/195
[51] Int. Cl............................................. C02c 1/06
[50] Field of Search........................... 210/12, 15,
195, 149, 180

[56] References Cited
UNITED STATES PATENTS

| 2,062,025 | 11/1936 | Harrington.................. | 210/15 X |
| 2,190,598 | 2/1940 | Fischer......................... | 210/12 X |
| 2,440,680 | 5/1948 | Gerin............................ | 210/149 X |
| 3,219,575 | 11/1965 | Chapman et al............. | 210/12 X |
| 3,337,448 | 8/1967 | Rich.............................. | 210/12 X |
| 3,356,609 | 12/1967 | Bruemmer.................... | 210/12 X |
| 3,368,967 | 2/1968 | Weaver et al................. | 210/12 |
| 3,462,275 | 8/1969 | Bellamy....................... | 210/15 X |

FOREIGN PATENTS

| 245,946 | 7/1963 | Australia...................... | 210/7 |

*Primary Examiner*—Michael Rogers
*Attorney*—Sughrue, Rothwell, Mion, Zinn & Macpeak

ABSTRACT: An aerobic method for purification of sewage water taking place at a sludge temperature above the ambient temperature, according to which method sludge is at first sedimented and then passed to a reactor vessel of small size, which vessel is insulated against loss of heat to the surroundings and in which vessel the sludge is subjected to exothermic oxygenation, while retaining the reaction heat generated.

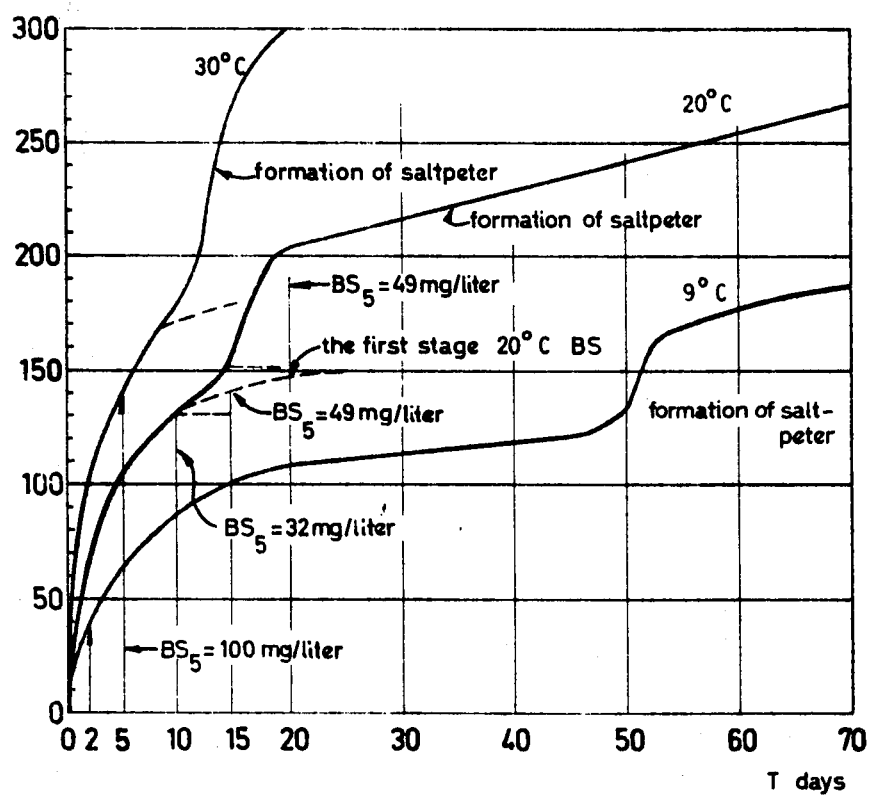

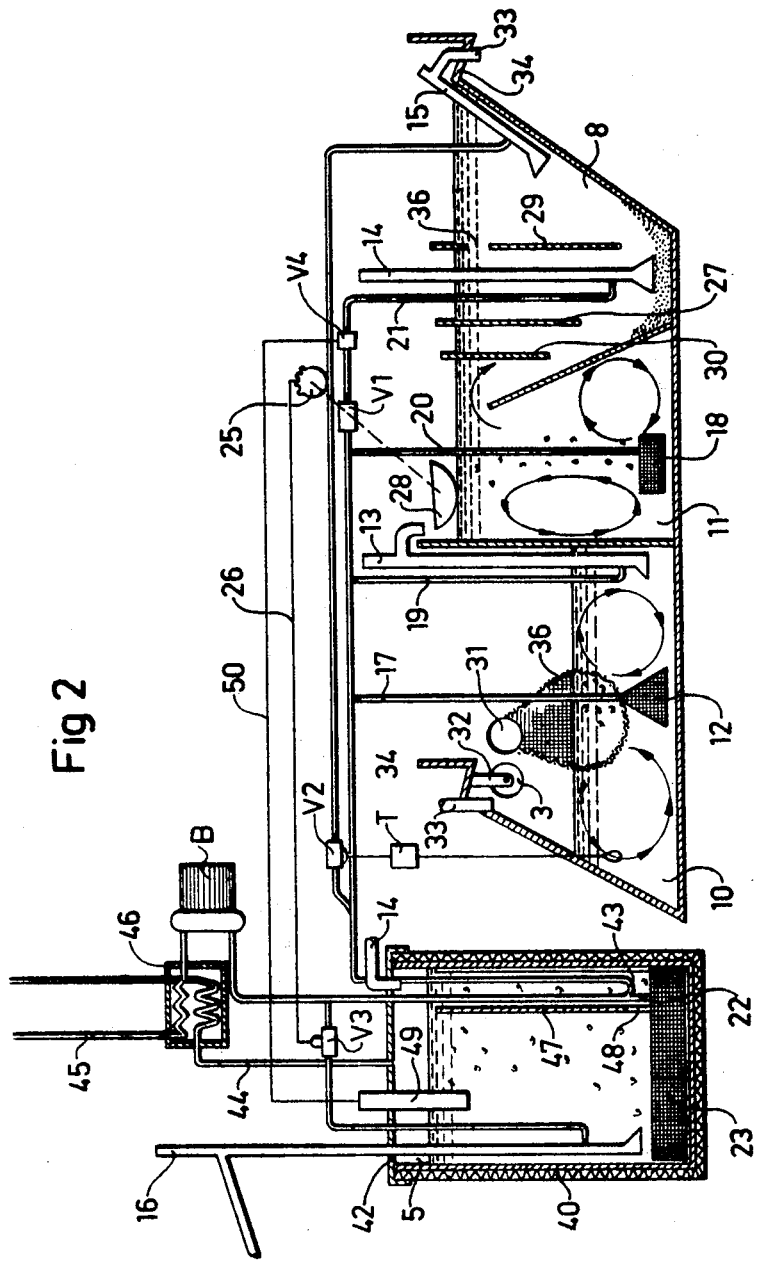

METHOD AND APPARATUS FOR THE AEROBIC PURIFICATION OF SEWAGE WATER AT A TEMPERATURE HIGHER THAN THE AMBIENT TEMPERATURE

The present invention is concerned with a method and apparatus for the aerobic purification of sewage water at a temperature above ambient temperature, essentially without supplying heat to the system.

Known methods of purifying sewage in a sedimentation tank requires the addition of large quantities of energy owing to the fact that the anaerobic sludge putrefaction process generates but small quantities of heat. Admittedly, methane ($CH_4$) is formed during the anaerobic sludge putrefaction process, which can be combusted in special furnaces to recover heat, which is then used to conduct the anaerobic putrefaction process. However, the heat of combustion of methane is relatively low, and hence the quantity of heat recovered is also low. Furthermore, the costs incurred by the special furnaces are relatively high. The reason why only small quantities of heat are released during the sludge putrefaction process is that said process is itself anaerobic, that is to say it takes place without oxygen being supplied to the system. Since, however, the optimum temperature of the sludge putrefaction process, i.e., the temperature at which a maximum percentage of the quantity or organic waste passed to the process is combusted, lies at about 30°–35° C. and in certain instances as high as 55° C. it is necessary to supply appreciable quantities of heat to the system. A further disadvantage associated with anaerobic putrefaction processes is that a significant proportion of the biological substance passed to the process is left uncombusted, even at said optimum temperature. The process is therefore made more expensive by the necessity of removing the incompletely putrefied sludge and rendering it harmless, possibly by drying the sludge and burning the dry substance.

Several attempts have been made to purify sewage water by applying an aerobic purification process in the form of a purely chemical wet combustion process (Zimmermann and others). These attempts have involved subjecting the sludge to elevate pressures and temperatures. Accordingly, the sludge has been charged to pressure vessels, whereupon the temperature has been raised to about 200° C. and oxygen fed to the process, whereafter wet combustion has commenced. This method has practically been abandoned because of difficulties met with in charging primary sludge to the pressure vessel without clogging the delivery lines, and because of the high equipment costs entailed in connection therewith.

The aforementioned process thus implies a purely chemical wet combustion of the sludge in the absence of all micro-organism activity. Attempts have also been made, however, to establish the possibility of expediting the purification sequence conditioned by aerobic micro-organisms by supplying the sewage water to the system in a heated condition, but these attempts have been confined to the laboratory since it has not been possible to perform such an aerobic purification process in an economical manner.

These problems and difficulties are overcome by means of the invention, which is concerned with a method and an apparatus for the aerobic purification of sewage water, and which is based on the well known fact that organic substances, hereinafter called biochemical oxygen demand B.O.D. are oxidized by bacteria or viruses by means of their enzyme system. It has been established experimentally that the oxygen consumption of an enzymatic system varies with time and temperature.

In the accompanying FIG. 1 there is presented a graph of the B.O.D. sequence at 9°, 20° and 30° C. isotherms; the graph showing the sequence in the decomposition and thus stabilization of putrefaction substances –under aerobic conditions –in sewage water and surface water, and hence the numerical values primarily relate to contaminated river water.

It is possible to separate two stages of the B.O.D. consumption sequence, these being a first stage in which accessible carboniferous organic substances are decomposed by the living organisms, and a second stage in which saltpeter is formed or nitrogen-containing substances are oxidized.

The first stage can be expressed mathematically. (See E.J.Therialut, U.S. Public Health Service Bull. 173. 1927). The type of mathematical equation used is to refer to the chemical reaction of the first degree. This is written as $y=L(1-e^{1kt})$, where $y$ is the decrease in B.O.D. per time unit $t$, $L$ is the original first stage B.O.D. and $k$ is the reaction velocity constant. When $t$ is given in days, $k$ is days [11]. The mean value of $k$ for sewage water from domestic sources is 0.39 at 20° C. All the isotherms relate to the same quantities of organic substances supplied, at the initial stages of the reaction.

As can be seen from the graph substantially larger quantities of oxygen depart at high temperatures than at low temperatures, at the same reaction times. The higher degree of oxygen consumption can reasonably be assumed to result in a more complete reaction, and thus a larger quantity of heat generated; according to the graph a reaction under this assumption, for instance, at 30° C. and a reaction period of 5 days generates almost four times the amount of heat generated by a reaction at 9° C. for a period of 2 days.

The present invention utilizes this circumstance and enables a sewage water purification process to be effected in a practical manner at a temperature above ambient temperature. It is mainly characterized in that the sludge present in the sewage water is isolated from the main body of the water (e.g. by flotation, sedimentation, centrifuging, filtration etc.) and passed to a special reaction vessel having but small volume in relation to the main body of the sewage water and presenting narrow external defining surfaces for the purpose of exothermic oxygen addition (bisorption), that said defining surfaces are insulated against loss of heat to the surroundings, so as to retain the reaction heat generated when oxygen is added to the sludge, and that the sludge is then subjected to aeration corresponding to the elevated temperature.

In this respect it is suitable to insulate said surfaces, and optionally also adopt other heat conservation measures, so that an elevated temperature is obtained of at least 15° C. and at most 40° C., and that the oxygen addition process is continued for a reaction period (the mean length of stay of the sludge in the reactor) of not less than 2 days and not more than 15 days.

The invention is also concerned with a system for purifying sewage water aerobically, in which the sludge in the sewage water is separated from the main mass of sewage water, e.g. by sedimentation, and oxygen is added in a reactor, and is mainly characterized in that the volume of the reactor corresponds to only a small portion of the main mass of sewage water so that a sludge reaction time of at least 2 days and at most 15 days is obtained, and that the reactor has small defining surfaces which are heat insulated against the surroundings to conserve the reaction heat generated when oxygen is added to the sludge, and to obtain a reaction temperature of between 15° C. and 40° C.

In a further embodiment of the invention the compression heat generated by a blower device used to aerate the sewage water is conserved by passing delivery air used to aerate the sewage water in a loop through the reactor. It is also expedient to collect moist air leaving the reactor, e.g., by placing a cover over the reactor, and to use said moist air to preheat the fresh air passed to the blower, e.g., by means of a heat exchanger. It is also within the concept of the invention to pass the fresh air to the blower through a chamber surrounding said blower, so as to conserve the heat generated therein.

In another embodiment of the invention the heat from the sludge leaving the reactor is retained by transferring said heat to the sludge passed to the reactor, by means of a heat exchanger for example.

To render the function of the reactor independent of the varying content of sludge in the sewage water arriving at the purification station the reactor is provided, in accordance with a further embodiment of the invention, with a heat-responsive means which, for instance electrically, controls the amount of sludge passed to the reactor in dependence on the temperature of the sludge present therein, in such a way that when optimal reaction temperature is reached in the reactor the supply of addition sludge is increased.

The invention will now be described with reference to the accompanying drawing, in which FIG. 1 is a B.O.D. graph, and FIG. 2 illustrates a sewage water purifying well according to the invention.

The graph presented in FIG. 1 shows a certain quantity of biochemical oxygen demand starting substance for 9° C., 20° C. and 30° C. isotherms. The quantity of B.O.D. is plotted along the ordinate in mg./l. while time T in days is plotted along the abscissa. The area of most interest for aerobic water purification has been found to be between 2 and 25 days and between 15° C. and 40° C., respectively. As will be seen from the graph, the consumption of oxygen obtained within this area is substantially higher at high temperatures than at low temperatures, for the same reaction time. As previously mentioned, this added consumption of oxygen can reasonably be assumed to cause a more complete reaction and thereby greater generation of heat. Therefore, in order to create higher temperatures in the enriched and concentrated sludge it has been found necessary to stay substantially within the first stage of the biochemical decomposing process.

FIG. 2 illustrates a sewage water purifying system similar to that described in U.S. Pat. application Ser. No. 717,547, filed Apr. 1, 1968, now U.S. Pat. No. 3,495,711 in which the well-forming outer wall of the apparatus is conceived to be opened out and flattened and in which the substantially radially extending, vanelike partition walls in the interior thereof have been shown in section, and have also the bottom and outer walls of the well. The apparatus includes a buffer chamber 10, a flocculating chamber 11, a sedimentation chamber 8 and a regeneration chamber 5. For the sake of clarity, the regeneration chamber has been moved from its position in the center of the well to the side of the aforementioned extension, wherewith it has been shown diagrammatically that the regeneration chamber is intended to lie slightly above the bottom of the remaining chambers.

As shown in FIG. 2, the buffer chamber 10 is provided with a sewage water inlet 31 and a net basket 35, which serves to effect a rough cleansing of the water. Located on the bottom of the buffer chamber 10 is an aeration cushion 12 which is divided functionally into two divisions and which causes strong aeration in two circulating or rotating zones of water. The water is in this way well prepared for the flocculating process, which takes place in the next chamber, the flocculation chamber. The flocculation chamber is also provided with an aerating cushion, designated 18, which is made of a foam plastic material.

Air is supplied to the cushion 12, the cushion 18, an aerating cushion 23, which covers the bottom of the regenerating chamber 15, and to the aforementioned airlift pumps by means of a blower device B, common to all said members, the device B supply air to said members via lines 17, 19, 20, 21, 22 and 24.

The sewage water is pumped from the buffer chamber 10 to the flocculating chamber 11 by means of an airlift pump 13, in which latter chamber a portion of the sewage water flow is picked up by a metering device, in the form of a tiltable scoop 28. The quantity of the sewage water picked up by the scoop 28 is dependent upon the total amount of sewage water passing to the system, thus indirectly also the amount of biochemical oxygen demand, B.O.D. contained in sewage water, while the remainder of the flow of sewage water passes along the side of said scoop, down into the flocculating chamber 11, where it is subjected to a gentle aeration process, by means of the foam plastic aerating cushion 18. The water is passed from the flocculating chamber 11, over the wall of the sedimentation chamber 8 into said chamber, passed three shield members 30, 27, 29, and to the spillway 34. During this time the floc has been able to settle on the bottom of the chamber 8, so that the water arriving at spillway 14 is clear. The water runs out from spillway 14 into the outlet 32 and 3.

Between the outlet of the airlift pump 13 and the metering device there may be arranged a flow sensing member which, depending upon the total amount of sewage water passing through the system, and thus also indirectly upon the quantity of biochemical oxygen demand contained in the sewage water, permits a greater or smaller portion of the flow of sewage water to flow down into the metering device 28, while the remainder of the flow passes by the scoop and runs down into the flocculating chamber 11.

The sludge is pumped from the sedimentation chamber 8 to the regenerating chamber 5 by means of an airlift pump 14. On the bottom of the regenerating chamber there is provided an aerating cushion 23, covering the whole of said bottom. The airlift pump 14 functions under the control of the metering device 28 in the flocculating chamber 11 in such a way that each time the scoop is tilted a direct-connected valve V1 is opened, to supply air to the airlift pump 14. Since the scoop 28 only picks up a quantity of sewage water which corresponds to the quantity of B.O.D. contained therein, the quantity of return sludge passed to the regenerating chamber will correspond to said quantity of B.O.D.

As will be evident from the aforegoing, all levels which are of importance to the biochemical purifying process are situated above the level of the spillway 2 of the buffer chamber 10, said spillway constituting the outlet 3 of the system.

The sludge entering the regenerating chamber 5 is spread over the whole of the aerating cushion 23, whereafter the sludge is caused to rise slowly as new sludge is introduced by means of the airlift pump 14. A valve means V3 is actuated by an extra control means 25 on the shaft of the tiltable scoop 28; for instance at each fifth stroke of the scoop. The valve device V3 passes air to an airlift pump 16, which moves a certain portion of the treated activated sludge from the regenerating chamber 5 to a container, from where it can be removed.

In accordance with the invention the regenerating chamber or reactor 5 is surrounded by an insulating member 40, which ensures that the heat generated when adding oxygen to the sludge is retained in the sludge.

In the reactor 5 there is also arranged a vertical tube 47, which conducts the sludge arriving through conduit 14. In the lower portion of the tube there is provided an opening 48, through which the sludge spreads over the aerating cushion 23.

In order to retain the compression heat generated from the blower B the air feedline to the sewage water purification station is passed in a loop 43 down in the tube 47, whereby the incoming sludge is preheated. The sludge passing from the reactor 5 via a spillway (not shown) back to the flocculating chamber 11 can be passed through a heat exchanger (not shown) for the purpose of retaining the heat accumulated in said sludge, and via which heat exchanger heat can be transmitted to the new sludge introduced through line 14.

The reactor may also be provided with an insulating cover 42 or some other means of collecting the moist air originating from the aerating cushion 23 and which has passed the sludge in the reactor during the aeration process. In accordance with the invention, this air is passed through a conduit 44 and a heat exchanger 46, to impart its heat content to a conduit 45 which conducts the incoming fresh air to the blower B.

In another embodiment of the invention the sewage water purification station has been made independent of the varying sludge content of the incoming sewage water by providing the reactor 5 with a heat responsive member 49 which via a line 50, e.g. electrically, actuates a valve V4 which controls the supply of addition sludge to the reactor by passing greater or smaller quantities of operating air to the airlift pump 14. In this way the quantity of addition sludge passed to the system is controlled in dependence of the temperature of the sludge in the reactor, so that upon reaching optimum reaction temperature in the reactor the quantity of addition sludge passed to the system is increased.

It should be understood, however, that although the invention has been described with reference to a number of embodiments thereof it can be varied within the scope of the following claims.

What I claim is:

1. A method for the aerobic purification of sewage water at elevated temperatures comprising
   a. separating sludge contained in the sewage water from the main body of said sewage water
   b. passing said sludge to an exothermic reaction zone possessing a small volume in comparison with the main body of the sewage water,
   c. treating said sludge therein with dispergated air provided in a quantity proportional to the biochemical oxygen demand so as to provide at 40° C. four times the volume of air used at 15° C., said reaction zone possessing small external defining surfaces, said defining surfaces being insulated against loss of heat to the surroundings so as to retain the reaction heat generated by oxygenation of the sludge and maintain the sludge at an elevated temperature of 15° C. to 40° C., the mean reaction time of the sludge in the reactor being 15 days.

2. In an apparatus for the aerobic purification of sewage water, means for separating the sludge contained in the sewage water from the main body of the sewage water by sedimentation, an aerating reactor vessel of small volume corresponding to a small portion of the main body of the sewage water, said vessel having small outer defining surfaces, insulating layers arranged at said surfaces against loss of heat to the surroundings, a blower device to aerate the sludge during operation of the system, means for recovering compression heat generated by said blower device, means for passing said recovered heat to the reactor vessel during the starting of the same, a reactor vessel cover member for collecting moist air departing from the reactor, and means for using said moist air to preheat the fresh air passed to the blower device.

3. The apparatus of claim 2 wherein the reactor vessel is provided with a heat responsive member which electrically regulates the supply of additional sludge to the reactor vessel dependent upon the sludge temperature therein, so that the supply of sludge is increased upon reaching optimum reaction temperature in the reactor.